United States Patent
Mansour et al.

(10) Patent No.: US 6,547,163 B1
(45) Date of Patent: Apr. 15, 2003

(54) HYBRID ATOMIZING FUEL NOZZLE

(75) Inventors: Adel B. Mansour, Mentor, OH (US); Michael A. Benjamin, Shaker Heights, OH (US); Thomas A. Burke, Mentor, OH (US); Andrew M. Odar, Chardon, OH (US); Barry W. Savel, Summerville, SC (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/660,564

(22) Filed: Sep. 12, 2000

Related U.S. Application Data

(60) Provisional application No. 60/161,773, filed on Oct. 27, 1999, and provisional application No. 60/157,328, filed on Oct. 1, 1999.

(51) Int. Cl.$^7$ ................................................. B05B 7/10
(52) U.S. Cl. ...................... 239/404; 239/405; 239/422; 239/423; 239/428
(58) Field of Search ................................ 239/399, 402, 239/403, 404, 405, 406, 418, 422, 423, 424, 424.5, 428, 429, 430, 433, 434.5, 463, 468, 472, 493, 518, 549, 556, 558, 561

(56) References Cited

U.S. PATENT DOCUMENTS

| | | | | |
|---|---|---|---|---|
| 3,013,732 A | * | 12/1961 | Webster et al. | 239/404 |
| 3,638,865 A | * | 2/1972 | McEneny et al. | 239/404 |
| 3,703,259 A | | 11/1972 | Sturgess et al. | |
| 3,717,306 A | * | 2/1973 | Hushon et al. | 239/404 |
| 3,777,983 A | * | 12/1973 | Hibbins | 239/406 |
| 3,853,273 A | | 12/1974 | Bahr et al. | |
| 4,198,815 A | | 4/1980 | Bobo et al. | |
| 4,406,610 A | * | 9/1983 | Duijvestijn | 239/400 |
| 4,428,727 A | * | 1/1984 | Deussner et al. | 110/261 |
| 4,570,668 A | | 2/1986 | Burke et al. | |
| 4,584,834 A | | 4/1986 | Koshoffer et al. | |
| 4,653,278 A | | 3/1987 | Vinson et al. | |
| 4,854,127 A | | 8/1989 | Vinson et al. | |
| 5,373,693 A | | 12/1994 | Zarzalis et al. | |
| 5,417,070 A | * | 5/1995 | Richardson | 210/285 |
| 5,737,921 A | * | 4/1998 | Jones et al. | 239/405 |
| 5,740,967 A | | 4/1998 | Simmons et al. | |
| 6,068,470 A | * | 5/2000 | Zarzalis et al. | 239/403 |
| 6,272,840 B1 | * | 8/2001 | Crocker et al. | 239/404 |

* cited by examiner

Primary Examiner—Christopher Kim
(74) Attorney, Agent, or Firm—Christopher H. Hunter

(57) ABSTRACT

A hybrid atomizing fuel nozzle includes a stem with primary and secondary fuel circuits. A nozzle assembly fixed at the downstream end of the stem includes primary and secondary nozzle portions. A shroud and swirler assembly surrounds the nozzle assembly, and includes an annular body with a prefilmer surface. A radial inflow swirler in the annular body directs a first swirling air flow radially inward toward the secondary nozzle portion. An outer air swirler disposed in surrounding relation to the annular body provides a converging second swirling air flow downstream of the prefilmer surface. Discrete fuel passages direct fuel streams outward and downstream toward and against the prefilmer surface. The fuel passes through the first air flow and is evenly distributed across the prefilmer surface in a thin continuous sheet. The first and second air flows then cause the sheet to form a conical spray of atomized fuel.

38 Claims, 6 Drawing Sheets

HYBRID ATOMIZING FUEL NOZZLE

CROSS-REFERENCE TO RELATED CASES

The present application claims priority to U.S. Provisional Application Serial No. 60/161,773; filed Oct. 27, 1999 and U.S. Provisional Application Serial No. 60/157,328; filed Oct. 1, 1999, both of which are incorporated herein by reference.

FIELD OF THE INVENTION

The present invention relates generally to nozzles for dispensing fluid, and more particularly to a hybrid atomizing fuel nozzle for gas turbine applications.

BACKGROUND OF THE INVENTION

A typical gas turbine combustor includes an array of fuel injectors disposed within a combustion chamber. A compressor provides pressurized air past the fuel injectors. Atomized fuel is sprayed from the injectors and the air facilitates ignition of the fuel downstream in the chamber.

One particularly useful nozzle for the fuel injectors is an airblast nozzle. In conventional airblast nozzles, fuel is directed through a fuel annulus and dispensed out through an annular fuel orifice between an inner airflow directed centrally through the nozzle, and an outer air flow directed inwardly through one or more in-flow swirlers. The fuel impinges upon an annular, tapered prefilmer at the downstream end of the fuel annulus, and is then atomized by the inner and outer air flows.

Airblast atomizers have significant advantages in their application to gas turbine combustion systems. The fuel distribution is primarily dictated by the air flow patterns, and hence the combustor outlet temperature is fairly insensitive to changes in fuel flow. Combustion is characterized by the absence of soot formation, resulting in relatively cool liners walls and minimum exhaust smoke. The primary disadvantages of airblast atomizers are their rather narrow stability limit and poor atomization quality at start up, owning to the low velocity of air through the combustor.

The drawbacks of airblast atomizers can be substantially overcome by combining the airblast atomizer with a pressure swirl atomizer, in what is generally referred to as a "hybrid airblast atomizer". A pressure swirl atomizer typically includes a swirl chamber that directs swirling fuel through a central orifice, where the fuel quickly atomizes into a thin, conical spray. Pressure swirl atomizers are known for their easy light-up and wide stability limits, although they are somewhat more sensitive to changes in fuel flow than pure airblast nozzles. At low fuel flows in a hybrid airblast atomizer, all of the fuel is supplied from the pressure swirl atomizer, and a well-atomized spray is obtained to give sufficient combustion at start-up and idle running conditions. Under cruise and higher power conditions, the fuel is supplied to both the pressure swirl atomizer and the airblast atomizer. At maximum power, most or all of the fuel is supplied to the airblast atomizer. By this structure, the merits of the pressure swirl atomizer at lower fuel flows are combined with the virtues of airblast atomization at higher flow rates.

While it is accepted that the hybrid airblast fuel injection strategy results in better engine performance throughout the engine cycle, current designs are believed deficient, in that the fuel circuit and the inner air flow for the airblast portion of the nozzle are typically radially crisscrossed. That is, the fuel passage for the pressure swirl atomizer is typically ported down the center of the housing stem. The fuel passage for the airblast atomizer is radially-outwardly spaced from (or surrounds) the pressure swirl atomizer fuel passage. At the discharge end of the nozzle, the fuel passage for the airblast atomizer is connected to a fuel annulus, which extends to an annular fuel discharge opening at the tip of the nozzle. Combustion air is ported radially inward of the airblast fuel passage (and outward of the pressure swirl atomizer fuel passage) near the tip of the nozzle to provide the inner air flow. The porting of the air through the nozzle tip is typically accomplished by drilling or forming multiple, radially-directed passages in the nozzle tip. The air passages cross radially through either the fuel annulus for the airblast fuel conduit or the fuel passage just prior to the annulus. The air passages extend to an annular air discharge opening radially inward of the fuel discharge opening.

For good secondary atomization, it is important that there be a sufficient number of air passages and that the air passages have a sufficient size to provide adequate air flow to the inner air circuit. The nozzle stem must also have sufficient size and strength to support the nozzle tip, as well as to maintain fuel circuit integrity. If the relatively cold fuel (at approximately 300° F.), passes too closely to the hot air passages (which often reach temperatures of 1000° F. at maximum engine power), rapid heating of the fuel can occur, which increases the fuel's propensity for coking. High differential temperatures and high thermal gradients can also lead to relatively high thermal stresses in the nozzle. These stresses can limit the working life of the fuel nozzle.

On the other hand, the size and weight of the nozzle is an important factor, as the size and weight of the nozzle can effect the size and weight of the engine, and hence the fuel economy of the aircraft. Aircraft manufacturers have demanded smaller and lighter-weight nozzles in an attempt to improve the fuel economy of the aircraft. In some instances this has required compromises in the number and size of the air passages through the nozzle stem. This can reduce the efficiency of the nozzle, which is undesirable in certain instances. This has also required the use of high strength, expensive allow materials for the nozzle tip, and complex heatshielding of the nozzle and the housing stem, which increases the manufacturing cost of the nozzles.

As such, while the known hybrid airblast nozzles overcome some of the disadvantages of simple airblast nozzles, it is believed there is a demand in the industry for a further improved hybrid airblast nozzle, and in particular a new and improved hybrid airblast nozzle that has a small, lightweight package; has simple air and fuel flow passages; requires less heatshielding; does not require costly, high-strength alloy materials; provides longer operating life as a result of reduced coking and thermal stresses, and which is thereby simpler and less costly to manufacture.

SUMMARY OF THE PRESENT INVENTION

The present invention provides a novel and unique nozzle for a fuel injector, and more particularly a hybrid atomizing fuel nozzle for gas turbine applications. The fuel nozzle has a small, lightweight package; has simple air and fuel flow passages; requires less heatshielding; has long operating life; and which thereby is simpler and less costly to manufacture. It is also relatively easy and straightforward to tailor the air flow through the nozzle for a particular application, without substantial modifications and without increasing the size of the nozzle.

According to the present invention, the inner air flow for the airblast portion of the nozzle is provided downstream from and entirely exterior to the nozzle tip. The inner air flow is provided by a radial in-flow swirler surrounding the nozzle tip, which directs the combustion air radially inward toward the tip. The fuel in the airblast fuel circuit is directed radially outward, preferably in discrete streams from a plurality of fuel passages formed around the tip of the nozzle, toward a prefilmer surface downstream of the radial in-flow swirler. The inner air flow passes radially inward through the fuel flow, downstream of the nozzle tip. By directing the air through the fuel stream, the fuel is spread out evenly in a thin film across the prefilmer surface, which results in an even, fully-atomized spray leaving the prefilmer surface.

The manufacturing costs of the nozzle are also reduced, as there is no need for drilling or forming air flow passages in the nozzle tip. The size of the nozzle can thereby be reduced, which reduces the weight (and cost) of the nozzle. The heatshielding requirements of the nozzle tip are also somewhat lessened as the high temperature combustion air is kept away from the sensitive portions of the nozzle tip. The operational life of the nozzle is also increased as the coking and thermal stresses are reduced. The air flow through the radial inflow swirler can also be easily adjusted merely by changing the length of the vanes and passages in the in-flow swirler, without having to otherwise modify the nozzle tip.

The hybrid fuel nozzle of the present invention is fixed to the end of a nozzle stem. The nozzle stem includes a primary/pilot fuel passage extending centrally through the stem, and a secondary/main fuel passage surrounding the primary fuel passage. The primary/pilot fuel passage is fluidly connected to a primary/pilot nozzle portion including a pressure swirl atomizer that provides fuel in a primary atomized spray. The secondary/main fuel passage is fluidly connected to a secondary/main nozzle portion, radially outward surrounding the primary/pilot nozzle portion, and including an airblast nozzle that provides fuel in a secondary atomized spray.

A shroud and swirler assembly surrounds the secondary nozzle portion and is fixed to the downstream end of the stem. The shroud and swirler assembly includes an annular body with the radial in-flow swirler at the upstream end of the body. The radial in-flow swirler directs air radially inward toward the secondary nozzle portion in a swirling, inner air flow. The internal prefilmer surface is located downstream from the radial in-flow swirler, and preferably has an annular, convex (outwardly-diverging) configuration. An outer air swirler, surrounding the annular body, provides a second swirling air flow downstream of the annular body. The outer air swirler has an inwardly-directed forward end, which directs the air in a converging manner in a swirling, outer air flow.

The secondary nozzle portion includes at least one fuel passage, and preferably includes a plurality of discrete fuel passages in an annular configuration, which direct fuel in streams radially outward toward and against the prefilmer surface. The fuel passages can be angled with respect to the central axis of the nozzle such that the passages supply the fuel in a swirling manner radially outward and downstream from the secondary nozzle portion. The fuel streams are directed outward through the swirling air from the radial in-flow swirler, which causes the fuel to accelerate and evenly distribute across the prefilmer surface in a thin, continuous sheet. The inner and outer air flows then cause the thin fuel sheet to quickly atomize and form a conical spray pattern downstream of the prefilmer surface.

An annular sleeve is disposed between the secondary nozzle portion and the annular body of the shroud and swirler assembly, and includes a forward (downstream) end with an annular concave surface. The concave surface of the sleeve is located adjacent the radial inflow swirler, and directs the air flow directly against the secondary nozzle portion, such that the high temperature combustion air does not contact the nozzle stem, or any other portion of the nozzle upstream from the fuel passages in the secondary nozzle portion. This reduces the heatshielding requirements around the nozzle tip.

The entire air circuit for the nozzle is integrated into one subassembly, while the entire fuel circuit of the nozzle is integrated into a separate subassembly. The subassemblies can be easily fixed (e.g., welded or brazed) together during assembly of the fuel injector and removed for inspection and repair or replacement. This also reduces the manufacturing and maintenance costs of the injector.

A hybrid atomizing fuel nozzle is thereby provided that has a small, lightweight package; has simple air and fuel flow passages; has long operating life; requires less heat-shielding; and which is thereby simpler and less costly to manufacture. It is also easy to obtain greater air flow for better atomization, or to otherwise adjust the air flow as necessary for a particular application.

Further features of the present invention will become apparent to those skilled in the art upon reviewing the following specification and attached drawings.

BRIEF DESCRIPTION OF THE DRAWINGS

FIG. 4A is a cross-sectional end view of fuel tip subassembly taken substantially along the plane described by the lines 4A–4A in FIG. 4;

DETAILED DESCRIPTION OF THE PREFERRED EMBODIMENT

Figure 1:
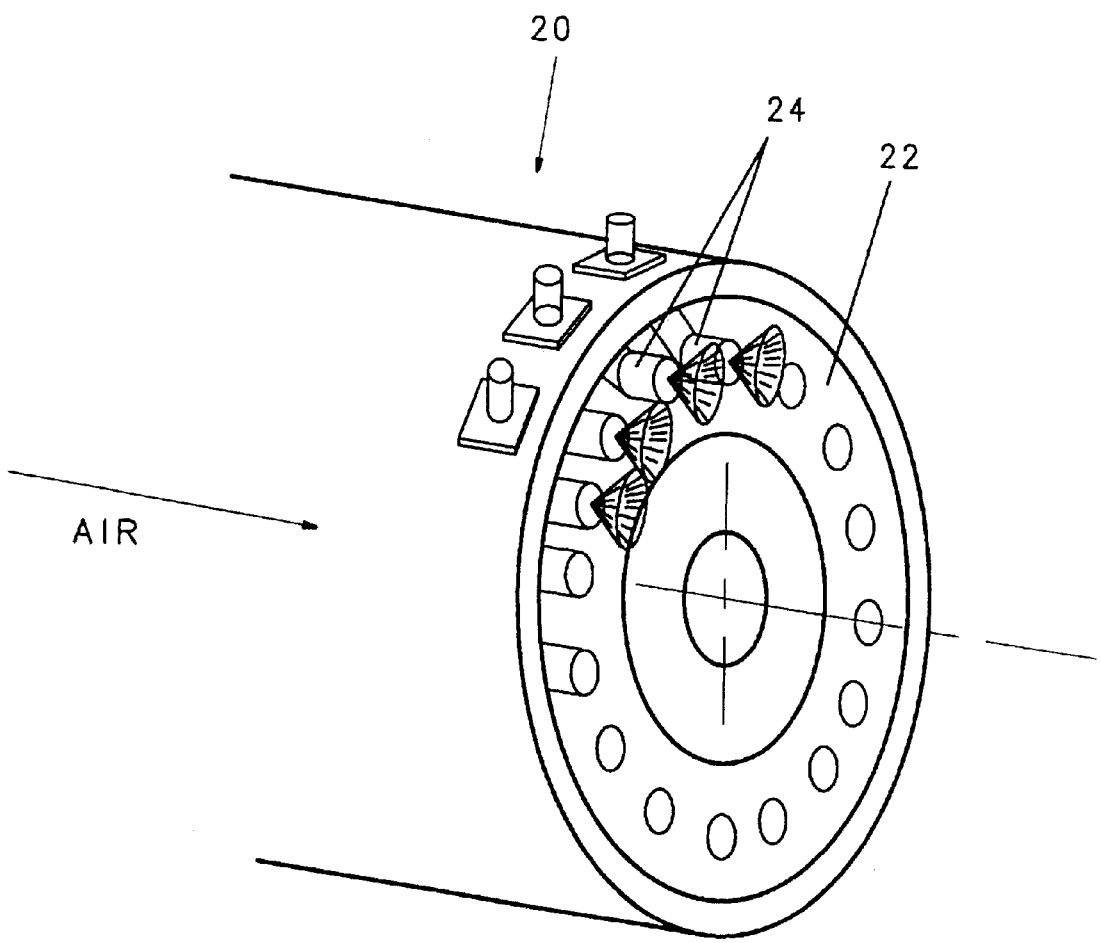
FIG. 1 is a cross-sectional side view of a combustion chamber with fuel injectors constructed according to the principles of the present invention.

Referring to the drawings, and initially to FIG. 1, a portion of a gas turbine engine is indicated generally at 20. The upstream, front wall of a combustion chamber for the engine is shown at 22, and a plurality of fuel injectors, for example, as indicated generally at 24, constructed according to the present invention are shown mounted within the chamber. The combustion chamber is a typical combustion chamber for aircraft applications, and will not be discussed further for sake of brevity. The fuel injectors 24 atomize and direct fuel into the combustor chamber for ignition. A compressor (not shown) is mounted upstream of the fuel injectors and provides pressurized air at elevated temperatures in the combustion chamber to facilitate the ignition. The air is typically provided at highly elevated temperatures, which can reach 1000° F. in aircraft applications.

While the fuel injectors of the present invention are particularly useful in gas turbine engines for aircraft, the present invention is believed useful in other types of applications, such as in industrial power generating equipment.

Figure 2:
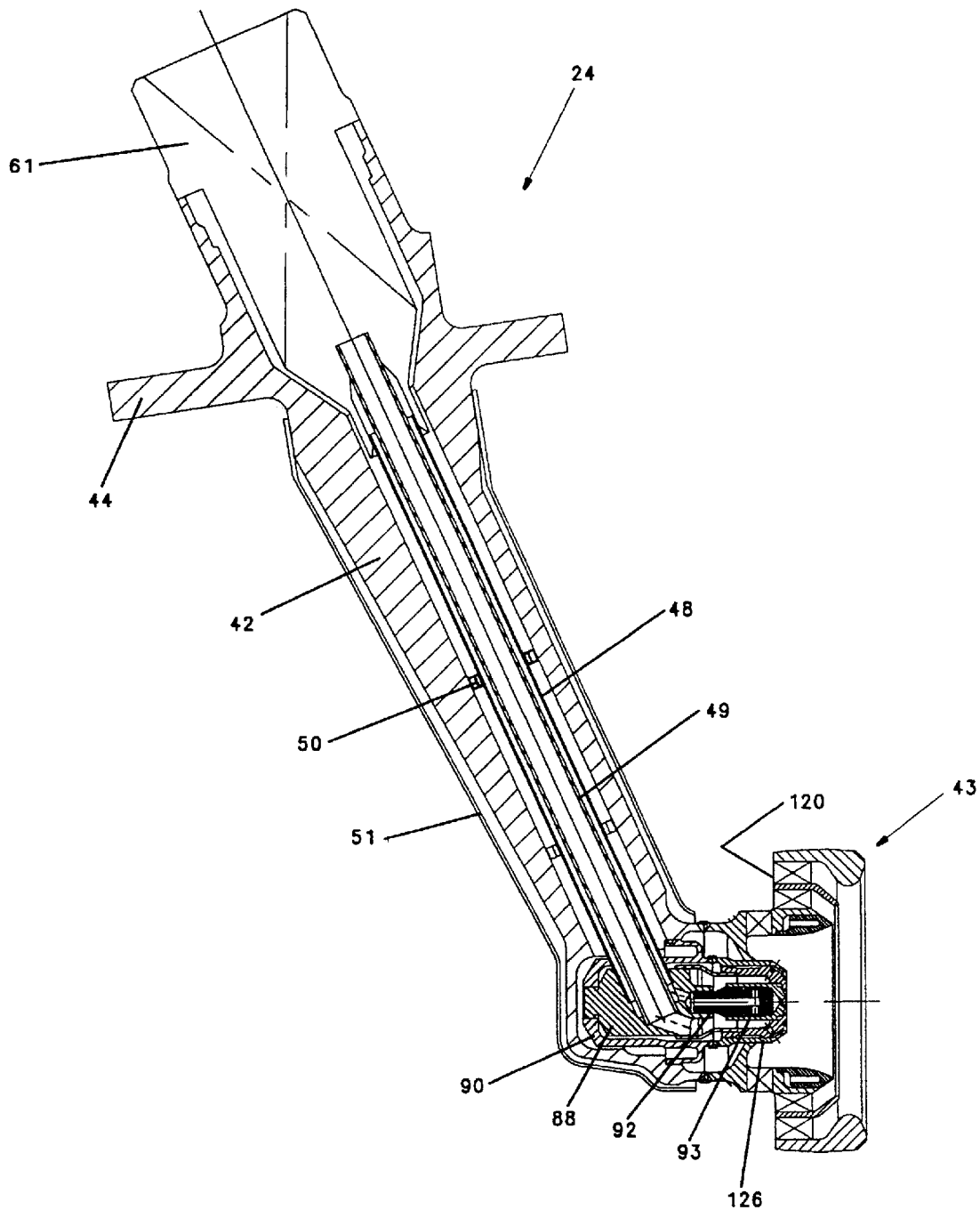
FIG. 2 is a cross-sectional side view of one of the fuel injectors of FIG. 1.

Referring now to FIG. 2, one of the fuel injectors 24 of the present invention is shown in more detail. The fuel injector 24 includes an elongated stem or housing 42 and a nozzle assembly, indicated generally at 43, supported at the downstream end of the stem. The nozzle assembly 43 of the injector includes both a pressure swirl atomizer portion and an airblast portion, as will be explained herein in more detail.

Stem 42 of the injector 24 is formed from appropriate material, and has an upstream attachment flange 44 which enables the injector to be fixed to the wall of the combustion chamber in a conventional manner, such as with bolts. The stem also has an upstream inlet body 61. A primary/pilot fuel tube 48 and a secondary/main fuel tube 49 are provided centrally through the stem 42 from the inlet body 61, with pilot tube 48 outwardly surrounding main tube 49. Tubes 48, 49 are formed from appropriate material, to provide passages for the fuel. Appropriate deformities (ridges, fins, etc.) can be provided in one or the other of the tubes to increase the heat transfer coefficient of the tubes, and thereby reduce the wetted wall temperatures.

Fuel is delivered separately to the primary and secondary fuel passages from the inlet body 61. This can be accomplished by various schemes, such as through separate inlet fittings or through a valve similar to that shown in U.S. Pat. No. 4,570,668, which is owned by the assignee of the present invention, and incorporated herein by reference. Appropriate stand-offs (fins) 50 are provided along the outer tube 49 to maintain an insulation gap between the tube and the inside walls of the stem 42. A heat shield 51 surrounds the stem 42 and at least a portion of the nozzle assembly 43, and is fixed, such as by brazing, to at least the upper end of the stem. Heat shield 51 is also formed from appropriate material to withstand the engine environment.

Referring now also to FIGS. 3–6, the nozzle assembly 43 includes a pilot (or primary) nozzle portion, indicated generally at 82, and a main (or secondary) nozzle portion, indicated generally at 84. The nozzle assembly includes a primary nozzle adapter 88 and a secondary nozzle adapter 90 which receive pilot and main fuel tubes 48, 49, and direct the fuel from the pilot and main fuel tubes to the primary nozzle portion and secondary nozzle portions 82, 84, respectively.

Figure 4:
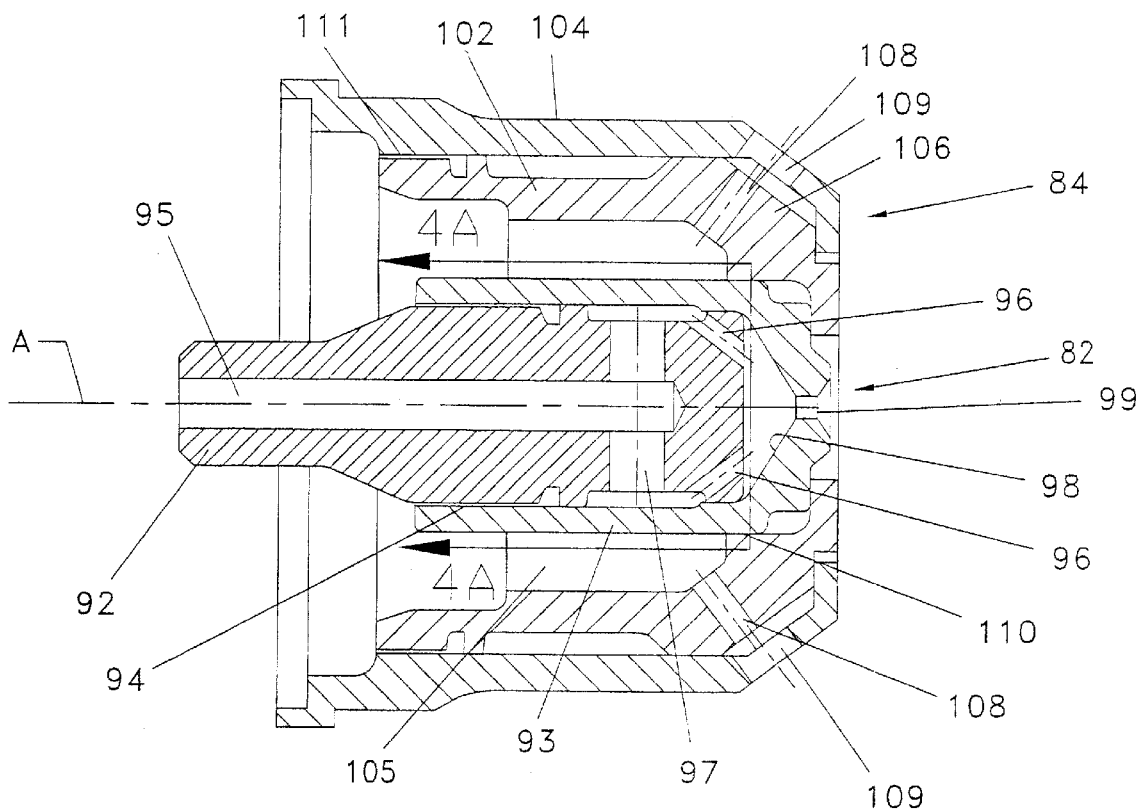
FIG. 4 is a cross-sectional side view of the fuel tip subassembly for the fuel nozzle.
Figure 4:
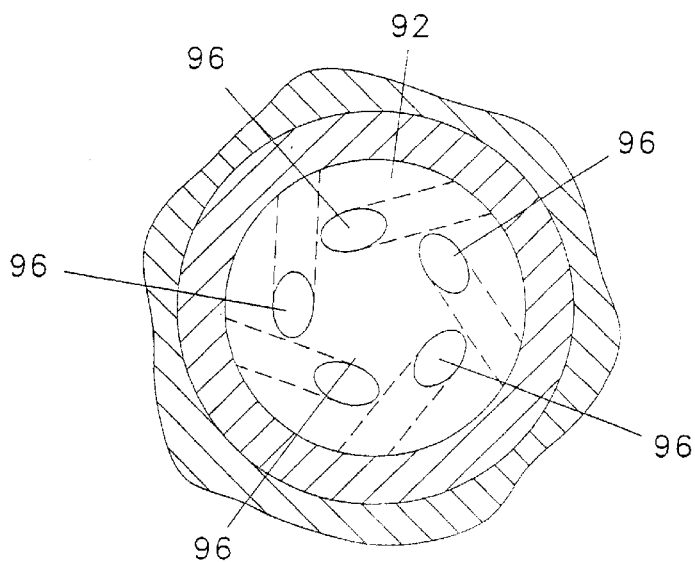

The primary nozzle portion 82 includes a cylindrical pilot swirler 92 closely received (e.g., with an interference fit) within a cup-shaped primary orifice body 93. The upstream end of swirler 92 is closely received in a bore in pilot adapter 88, while the downstream end of swirler 92 is fixed (such as by brazing at 94) to primary orifice body 93. As shown in FIG. 4, pilot swirler 92 has a central pilot fuel passage 95 which receives fuel from pilot tube 48 and feeds the fuel to one or more discharge passages 96 via one or more intermediate passages 97. Discharge passages 96 are preferably angled (tangential) with respect to the central geometric axis "A" of the nozzle assembly (see FIG. 4A) to cause the fuel to swirl when dispensed through the passages. The swirling fuel impinges upon the conical inner end surface 98 of body 93, and is directed out through a central orifice 99 at the tip of the nozzle assembly in a hollow conical, atomized spray. The primary nozzle portion 82 defines the pressure swirl atomizer portion of the nozzle assembly.

The particular structure of the pressure swirl atomizer nozzle described above is only exemplary, and other pressure swirl atomizers could be used with the present invention, such as the macrolaminate nozzle shown in U.S. Pat. No. 5,740,967, which is incorporated herein by reference. Moreover, while it is preferred that the present invention include a primary nozzle portion, it is possible that the nozzle assembly could include only the secondary nozzle portion (and no primary nozzle portion) in certain applications.

The secondary nozzle portion 84 surrounds the primary nozzle portion 82 and includes an annular main body 102 surrounded by an annular main heatshield 104. A secondary annular fuel passage 105 is defined between the main body 102 and primary orifice body 93 which receives fuel from main fuel tube 49. Main body 102 includes an angled downstream end 106, which extends preferably at about 45 degrees with respect to the central axis "A" of the nozzle. At least one, and preferably a plurality of fuel passages 108 (see FIG. 6) are provided in an annular, evenly-spaced arrangement in end 106 and direct the fuel in stream(s) outwardly away from the secondary nozzle portion. Passages 108 also preferably extend at about a 45 degree angle with respect to the central axis "A" to dispense the fuel in a downstream direction. Passages 108 can also be tangentially disposed relative to the axis, such that the fuel is provided in a swirling motion when it is dispensed through the passages. Preferably eight of such passages 108 are provided, although the number, location and angle of the passages can vary depending upon the particular application. In addition, it is possible that an annular orifice, rather than individual passages could be provided, such that the fuel is dispensed in a continuous annulus from the secondary nozzle portion, rather than in discrete streams.

Heat shield 104 corresponds substantially to the geometry of the main body 102 and includes openings 109 corresponding to the location of the passages 108 to allow the unobstructed flow of fuel from the fuel passages. Main body 102 and heat shield 104 are formed from an appropriate material and are fixed together, such as by brazing at 111. Main body 102 is also fixed (e.g., brazed at 110) to primary orifice body 93 such that these components are all firmly held together. The components of the primary and secondary nozzle portions 82, 84 can be pre-assembled together into a fuel circuit subassembly, as shown in FIG. 4.

Figure 3:
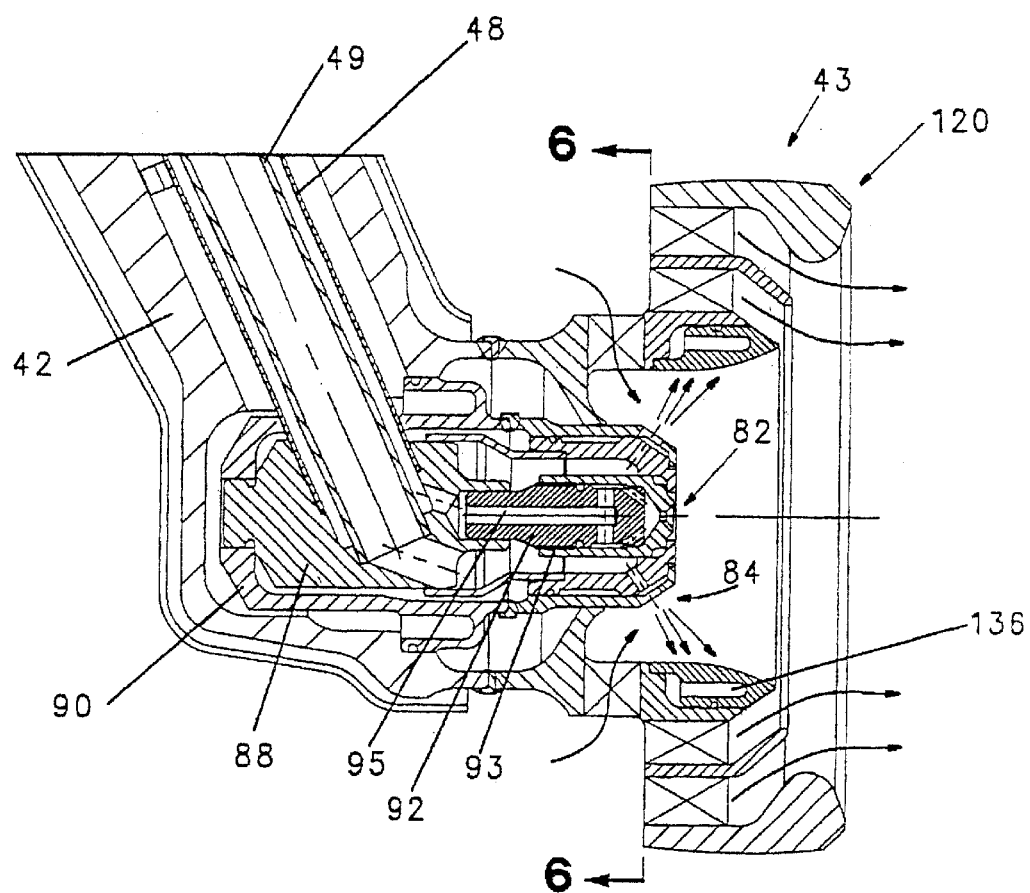
FIG. 3 is an enlarged, cross-sectional side view of the fuel tip and air swirlers of the fuel injector of FIG. 2.
Figure 5:
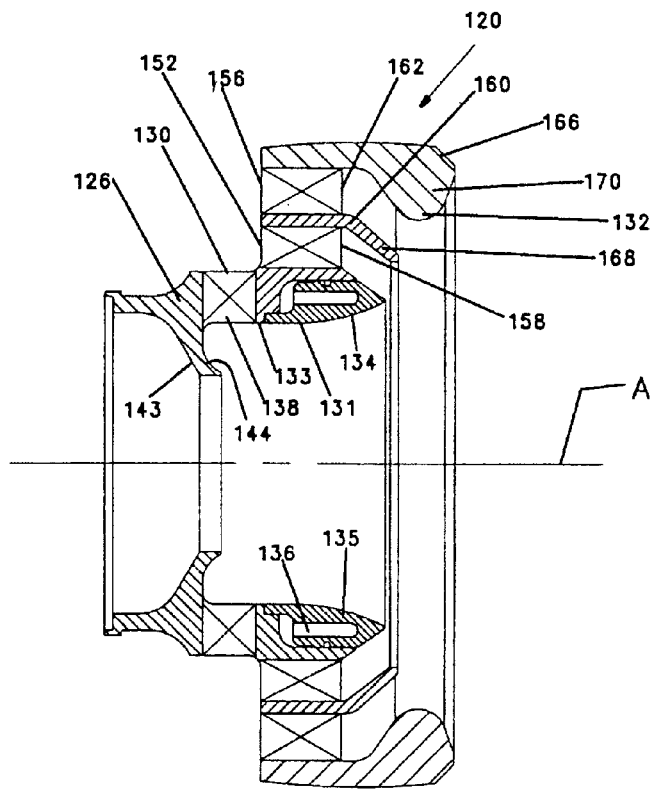
FIG. 5 is a cross-sectional side view of the air circuit subassembly for the nozzle.
Figure 6:
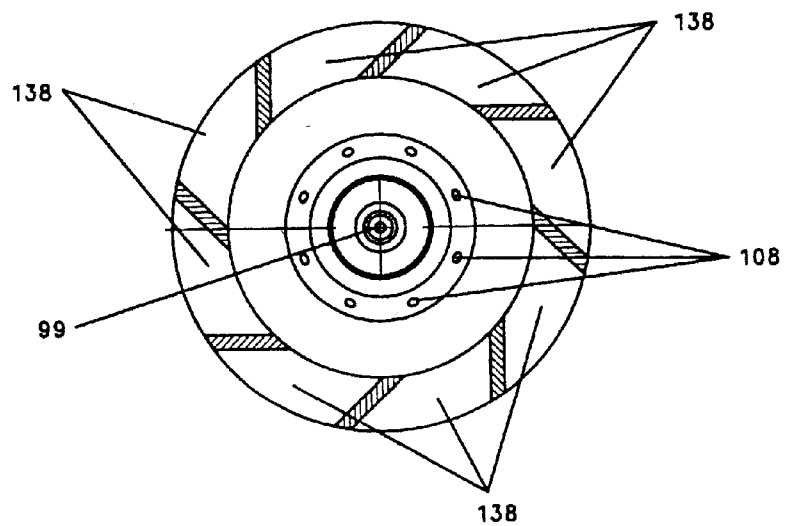
FIG. 6 is a cross-sectional end view of the nozzle taken substantially along the plane described by the lines 6—6 of FIG. 3.

Referring now to FIGS. 3 and 5, the nozzle assembly 43 further includes a shroud and swirler assembly, indicated generally at 120, surrounding the secondary nozzle portion 84. The shroud and swirler assembly 120 has an annular body 126 with an upstream radial inflow swirler 130 and an inner prefilmer surface 131; and an outer swirler assembly 132, outwardly surrounding the annular body 126. The prefilmer surface 131 is arranged such that the passages 108 direct the fuel radially outward and axially downstream against the prefilmer surface. Surface 131 has an axial upstream portion 133 smoothly transitioning to a smooth, diverging (convex) downstream portion 134. The convex configuration assists the fuel in forming a thin, continuous sheet across the surface, and in accelerating the fuel as the fuel passes downstream along the surface. The annular body 126 can also include a downstream heatshield portion 135 with an inner air cavity 136 for thermal protection, or alternatively, can be formed unitarily in one piece. It should be noted that the conical spray from the primary nozzle portion 82 preferably has a narrow profile such that the fuel from this nozzle portion does not also impinge (or at least does not substantially impinge) upon the prefilmer surface.

The shroud and swirler assembly 120 together with the secondary nozzle portion 84, define the airblast portion of the nozzle assembly.

The radial inflow swirler 130 is located upstream from the prefilmer surface and includes a series of circumferentially spaced, radial in flow vanes 138 designed to direct combustion air radially inward in a swirling manner toward the tip of the secondary nozzle portion. The vanes are preferably flat and oriented tangentially to the central axis of the nozzle (to cause swirling), although they may also be helical or otherwise curved. The radial inflow swirler has a streamlined geometry with the flow area decreasing in the direction of flow. This minimizes boundary layer growth and prevents boundary layer separation. The number, orientation and location of the vanes 138 can vary depending upon the desired air flow, and eight of such vanes are shown for exemplary purposes, essentially adjacent the fuel passages 108. The axial length of the vanes and the passages between the vanes can also be easily changed to increase (or decrease) the amount of air passing through the radial inflow swirler. This can typically be accomplished without otherwise modifying the shroud and swirler assembly.

The body 126 has an annular frustoconical flange 143 which tapers radially-inward, and has an outer, concave surface 144, facing and directly adjacent to the exit of the radial inflow swirler 130. The flange 143 of annular body 126 closely surrounds the outer surface of main heatshield 104. Surface 144 directs the air from a primarily radial/tangential direction when it is received from the vanes 138 to a primarily axial/tangential direction. The annular sleeve directs the air directly against the tip of the secondary nozzle portion 82, preferably essentially at the location of the fuel passages 108, and in any case, not too far upstream of the fuel passages. Annular body 126 and flange 143 thereby shield the upstream portion of the nozzle assembly from the hot combustion air directed through the radial in-flow swirler, and ensure that the air only essentially contacts the tip of the secondary nozzle portion. Since the hot combustion air is only in contact with the nozzle assembly in the area immediately adjacent the secondary nozzle portion, it is not necessary for additional or significant heatshielding of the nozzle stem, or even the portion of the nozzle assembly upstream from the secondary nozzle portion.

Thus, while the fuel streams are directed radially outward and axially downstream from the passages 108 in body 102 (in a swirling flow) against the prefilmer surface 131; the air flow through the swirler vanes 138 is at the same time being directed radially inward in a swirling inner air flow. The aerodynamic drag forces from the air/fuel interface accelerates the fuel, to assist distributing the fuel evenly in a thin sheet across the prefilmer surface. The air flow passes inwardly of the fuel streams to form a swirling, inner air flow centrally of the fuel sheet for atomization of the fuel downstream from the prefilmer surface 131.

The outer air swirler assembly 132 includes first and second air swirlers 152, 156, with the first (inner) swirler 152 located concentrically inward of the second (dome) air swirler 156. Each swirler includes a plurality of helical, curved or angled vanes and is formed from appropriate material to withstand engine environment. Vanes 158 of inner swirler 152 are brazed to the outer surface of body 126, and to the inner surface of an intermediate annular shroud 160; while vanes 162 of the dome swirler 156 are brazed to the outer surface of the intermediate shroud 160, and to the inner surface of an outer annular shroud 166. Vanes 158 and 160 direct the combustion air along the axis A of the nozzle. Vanes 158 and 160 can be configured to provide co-rotating or counter-rotating air flows. Vanes 158 and 160 of the outer air swirler assembly 132 can also be co-rotating or counter-rotating with vanes 138 of the radial inflow swirler 130. The number and orientation of the vanes can vary depending upon the particular application, as should be apparent to those skilled in the art. The annular body 126 and outer air swirler assembly 132 of the shroud and swirler assembly can be pre-assembled together into an air circuit subassembly, as shown in FIG. 5.

Both intermediate shroud 160 and outer shroud 166 include inwardly-directed annular downstream portions which then direct the air flows in a converging manner toward the central axis A.

Intermediate shroud 160 includes an annular, inwardly tapered (frustoconical) downstream end 168 which provides the primary outer air flow for atomization at the prefilmer lip; while outer shroud 166 includes an annular bulbous portion 170 which provides good spray patternation and adequate droplet dispersion. The inner and outer shrouds direct the air flows in a swirling manner at approximately a 45 degree angle to the central axis, but again, this can vary depending upon the particular application, and it is generally preferred that the inner swirler 152 provide a more focused air flow than the dome swirler 156. In any case, a relatively wide flow and spray angle is provided by the airblast portion of the nozzle assembly.

As the fuel sheet releases from the downstream lip of the prefilmer surface 131, the sheet is impacted by the converging air from the outer air swirlers 152, 156, and the inner air flow provided by the radial inflow swirler 138. A fairly significant velocity gradient is established at the prefilmer lip that results in a high shear rate at the locations where the incoming fuel streams impinge. The sheet is quickly atomized into a fine dispersion, and is evenly distributed in a conical spray. The nozzle assembly of the present invention has been found to provide good spray performance, a wide spray angle, and essentially no streaks, voids or non-homogeneities.

While a dual outer air flow swirler is shown, it is also possible that three or more outer air swirlers can be provided, each of which would be concentrically arranged, and in surrounding relation to one another. It is also possible that only a single outer air swirler could be provided, to provide a single swirling, converging air flow. Such swirlers should be well apparent to those skilled in the art and will not be discussed herein for sake of brevity.

Figure 7:
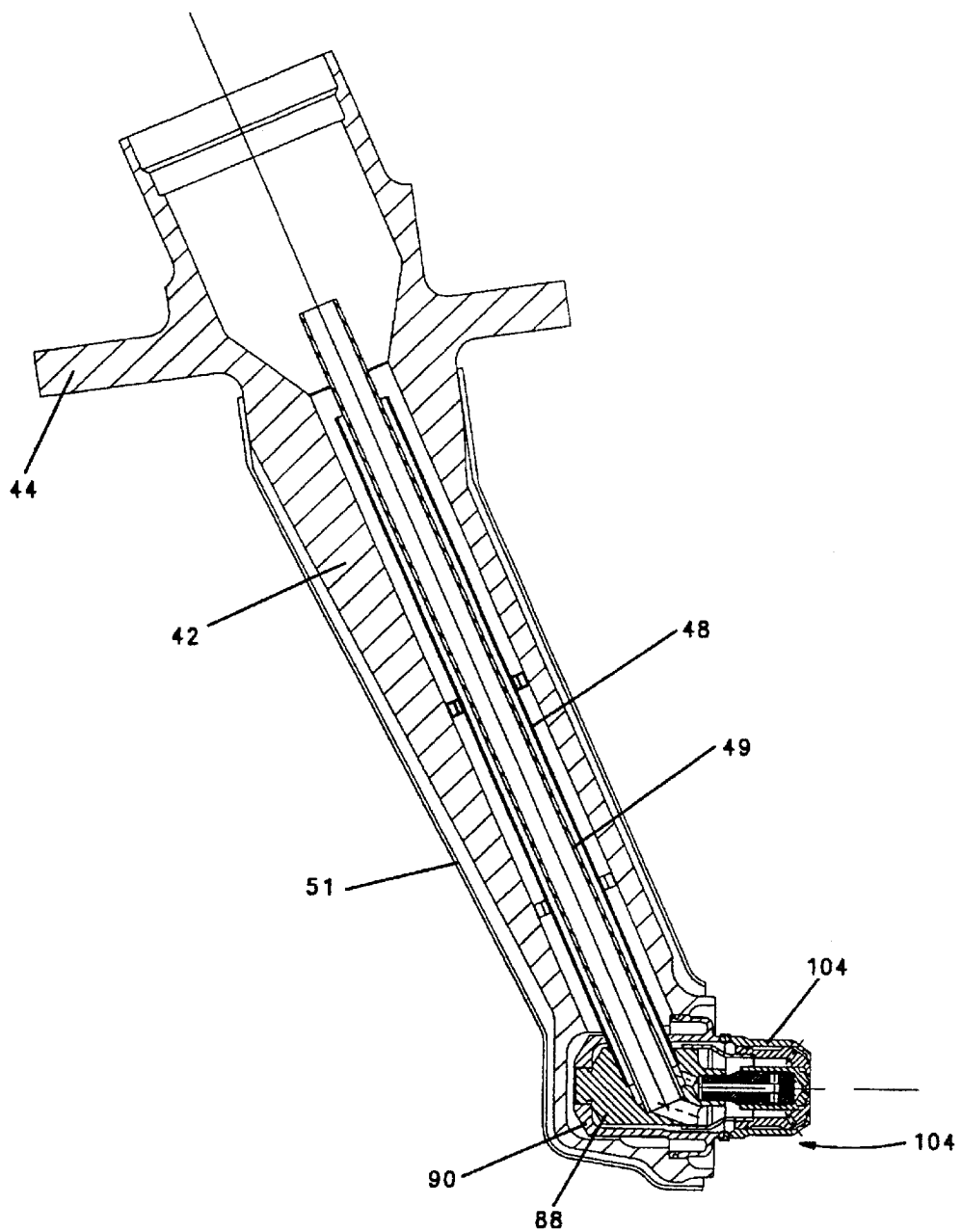
FIG. 7 is a cross-sectional side view of the injector of FIG. 2 showing one step in the assembly process.

Referring now to FIG. 7, the stem 42, tubes 48, 49, and heatshield 51 are initially pre-assembled together, along with pilot and tip adapters 88, 90. The preassembled fuel circuit subassembly (from FIG. 4) is then fixed to these components with main heatshield 104 being fixed (e.g., welded) directly to the adapter 90. Next, the pre-assembled air circuit subassembly 120 (from FIG. 5) is fixed to these components, with the upstream end of body 126 fixed (e.g., welded) directly to the downstream end stem 42 (see FIG. 2). The various components of the fuel injector are formed from material appropriate for the particular application, for example, Hast-X and SS347, as should be known to those skilled in the art.

A hybrid atomizing fuel nozzle is thereby provided that has a small, lightweight package; has simple air and fuel flow passages; requires less heat-shielding; has a longer operational life due to reduced stress and coking; and which is thereby simpler and less costly to manufacture. It is also easy to obtain greater air flow for better atomization, or to otherwise adjust the air flow as necessary for a particular application.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A fuel injector, comprising:
   a nozzle stem including a primary fuel passage and a secondary fuel passage;
   a nozzle assembly fixed at a downstream end of the nozzle stem, said nozzle assembly including i) a primary nozzle portion in fluid communication with the primary fuel passage and providing fuel in a primary atomized spray;
   ii) a secondary nozzle portion radially outward surrounding the primary nozzle portion, said secondary nozzle portion in fluid communication with the secondary fuel passage and providing fuel in a secondary atomized spray; and
   iii) a shroud and swirler assembly radially outward surrounding the secondary nozzle portion, said shroud and swirler assembly including an annular body with a) an internal prefilmer surface at a downstream end of the body, and b) a radial inflow swirler at an upstream end of the prefilmer surface for directing a first swirling air flow radially inward toward the secondary nozzle portion, and said shroud and swirler assembly also including an outer axial air swirler for directing a second swirling air flow in an axial and then a converging manner downstream of the prefilmer surface; said secondary nozzle portion including at least one fuel passage with an orifice for directing fuel radially-outward toward and against the prefilmer surface, the fuel being directed outwardly through the first swirling air flow to cause the fuel to evenly distribute across the prefilmer surface in a thin and continuous sheet, the first and second swirling air flows inwardly and outwardly bounding the sheet and causing the sheet to quickly atomize downstream of the prefilmer surface.

2. The fuel injector as in claim 1, wherein the annular body of the shroud and swirler assembly is located relative to the secondary nozzle portion such that the radial inflow swirler directs the first swirling air flow directly towards the secondary nozzle portion.

3. The fuel injector as in claim 2, wherein the radial inflow swirler is downstream of the nozzle stem.

4. The fuel injector as in claim 3, wherein the radial inflow swirler includes vanes oriented to direct air in a radially inward swirling manner.

5. The fuel injector as in claim 4, further including a plurality of radially-outward extending fuel passages located in an annular arrangement around the secondary nozzle portion to direct fuel in a plurality of discrete fuel streams toward and against the prefilmer surface.

6. The fuel injector as in claim 1, wherein the outer air swirler includes vanes initially directing the secondary air flow in an axial manner relative to the nozzle assembly, and a downstream portion which then directs the air in a converging manner toward the central axis of the nozzle assembly.

7. The fuel injector as in claim 1, wherein the radial inflow swirler includes radially-directed swirler vanes located upstream of the prefilmer surface, and the outer swirler includes axially-directed swirler vanes in outwardly-surrounding relation to the annular body of the shroud and swirler assembly.

8. The fuel injector as in claim 1, wherein the prefilmer surface of the annular body of the shroud and swirler assembly has an annular convex configuration, diverging away from the central axis of the nozzle assembly.

9. The fuel injector as in claim 1, wherein the at least one fuel passage is also angled downstream to direct the fuel in a radially-outward and downstream direction.

10. The fuel injector as in claim 9, wherein the at least one fuel passage is also oriented to direct the fuel in a swirling manner.

11. The fuel injector as in claim 1, further including an annular sleeve disposed between the secondary nozzle portion and the annular body of the shroud and swirler assembly, the sleeve including a forward end having an outwardly facing annular concave portion directing the first air flow from a radially-inward direction to essentially an axial direction and directly against the secondary nozzle portion.

12. The fuel injector as in claim 1, wherein the primary nozzle portion defines a pressure swirl atomizer nozzle integral with the fuel injector.

13. The fuel injector as in claim 12, wherein the secondary nozzle portion and the shroud and swirler assembly defines an airblast nozzle integral with the fuel injector.

14. An atomizing fuel nozzle for a fuel injector, comprising:
   a nozzle assembly including i) a pressure swirl atomizer portion providing fuel in a primary atomized spray; ii) an airblast nozzle portion radially outward surrounding the pressure swirl atomizer, said airblast nozzle portion providing fuel in a secondary atomized spray; and iii) a shroud and swirler assembly radially outward surrounding the airblast nozzle portion, the shroud and swirler assembly having an annular body with an internal prefilmer surface at a downstream end of the body, said body further including a radial inflow swirler at an upstream end of the prefilmer surface for directing a first swirling air flow radially inward toward a tip of the airblast nozzle portion, and an outer axial air swirler for directing a second swirling air flow in an axial and then a converging manner toward the central axis of the nozzle assembly downstream of the prefilmer surface;
   said airblast nozzle portion including at least one fuel passage with an orifice directing fuel radially-outward toward and against the prefilmer surface, the fuel being directed outwardly through the first air flow to cause the fuel to evenly distribute across the prefilmer surface in a thin and continuous sheet, the first and second air flows inwardly and outwardly bounding the sheet and causing the thin sheet to quickly atomize downstream of the prefilmer surface.

15. The atomizing fuel nozzle as in claim 14, wherein the annular body of the shroud and swirler assembly is located relative to the airblast nozzle portion such that the radial inflow swirler directs the first swirling air flow directly towards the airblast nozzle portion.

16. The atomizing fuel nozzle as in claim 15, wherein the radial inflow swirler includes vanes oriented to direct air in a radially inward swirling manner.

17. The atomizing fuel nozzle as in claim 16, further including a plurality of radially-outward extending fuel passages located in an annular arrangement around the airblast nozzle portion to direct fuel in a plurality of discrete fuel streams toward and against the prefilmer surface.

18. The atomizing fuel nozzle as in claim 17, wherein the outer air swirler includes vanes initially directing the secondary air flow in an axial manner relative to the nozzle assembly, and a downstream portion which then directs the air in a converging manner toward the central axis of the nozzle assembly.

19. The atomizing fuel nozzle as in claim 14, wherein the radial inflow swirler includes radially-directed swirler vanes located upstream of the prefilmer surface, and the outer swirler includes axially-directed swirler vanes in outwardly-surrounding relation to the annular body of the shroud and swirler assembly.

20. The atomizing fuel nozzle as in claim 14, wherein the prefilmer surface of the annular body of the shroud and swirler assembly has an annular convex configuration, diverging away from the central axis of the nozzle assembly.

21. The atomizing fuel nozzle as in claim 14, wherein the at least one fuel passage is also angled downstream to direct the fuel in a radially-outward and downstream direction.

22. The atomizing fuel nozzle as in claim 14, wherein the at least one fuel passage is also oriented to direct the fuel in a swirling manner.

23. The atomizing fuel nozzle as in claim 14, further including an annular sleeve disposed between the airblast nozzle portion and the annular body of the shroud and swirler assembly, the sleeve including a forward end having an outwardly facing annular concave portion directing the first air flow from a radially-inward direction to essentially an axial direction and against the airblast nozzle portion.

24. A fuel circuit subassembly for a hybrid atomizing fuel nozzle, the fuel circuit subassembly including:
i) a pressure swirl atomizer portion providing fuel in a primary atomized spray; and ii) an airblast nozzle portion radially outward surrounding the pressure swirl atomizer portion, said airblast nozzle portion providing fuel in a secondary atomized spray;
ii) said airblast nozzle portion including an annular main body with an inwardly angled downstream end, said angled downstream end having a plurality of fuel passages with orifices directing fuel in discrete streams radially-outward and downstream from the main body; and
an annular heatshield surrounding the annular main body, and including an inwardly angled downstream end enclosing the inwardly angled downstream end of the annular main body, and having openings corresponding to the orifices of the fuel passages such that fuel can be dispensed in an uninterrupted manner from the fuel passages.

25. A gas turbine combustion assembly, including:
a combustor chamber and a fuel injector supported within the combustion chamber, the combustor chamber directing pressurized air past the fuel injector to facilitate ignition of fuel, the fuel injector including:
a nozzle stem including a primary fuel passage and a secondary fuel passage;
a nozzle assembly fixed at a downstream end of the nozzle stem, said nozzle assembly including i) a primary nozzle portion in fluid communication with the primary fuel passage and providing fuel in a primary atomized spray;
ii) a secondary nozzle portion radially outward surrounding the primary nozzle portion, said secondary nozzle portion in fluid communication with the secondary fuel passage and providing fuel in a secondary atomized spray; and
iii) a shroud and swirler assembly, radially outward surrounding and fixed at the downstream end of the nozzle stem, said shroud and swirler assembly including an annular body with an internal prefilmer surface at a downstream end of the body, said body further including a radial inflow swirler at an upstream end of the prefilmer surface directing a first swirling air flow radially inward toward the secondary nozzle portion, and said shroud and swirler assembly further including an outer axial air swirler, the outer air swirler directing a second swirling air flow in an axial and then a converging manner downstream of the prefilmer surface; said secondary nozzle portion including at least one fuel passage with an orifice directing fuel in a stream radially-outward toward and against the prefilmer surface, the fuel stream being directed outwardly through the first swirling air flow to cause the fuel stream to swirl and evenly distribute across the prefilmer surface in a thin sheet, and the first and second swirling air flows inwardly and outwardly bounding the sheet and causing the thin sheet to then form a spray of atomized fuel downstream of the prefilmer surface.

26. The gas turbine combustion assembly as in claim 25, further including an annular sleeve disposed between the secondary nozzle portion and the angular body of the shroud and swirler assembly, the sleeve including a forward end having an outwardly facing annular concave portion directing the first air flow from a radially-inward direction to essentially an axial direction and against the secondary nozzle portion.

27. A fuel injector, comprising:
a nozzle stem including a fuel passage;
a nozzle assembly fixed at a downstream end of the nozzle stem, said nozzle assembly including a nozzle portion in fluid communication with the fuel passage and providing fuel in an atomized spray; and
a shroud and swirler assembly radially outward surrounding the nozzle portion, said shroud and swirler assembly including an annular body with a) an internal prefilmer surface at a downstream end of the body, and b) a radial inflow swirler at an upstream end of the prefilmer surface for directing a first swirling air flow radially inward toward the nozzle portion, and said shroud and swirler assembly also including an outer axial air swirler for directing a second swirling air flow in an axial and then a converging manner downstream of the prefilmer surface;
said nozzle portion including at least one fuel passage with an orifice for directing fuel radially-outward toward and against the prefilmer surface, the fuel being directed outwardly through the first swirling air flow to cause the fuel to evenly distribute across the prefilmer surface in a thin and continuous sheet, the first and second swirling air flows inwardly and outwardly bounding the sheet and causing the sheet to quickly atomize downstream of the prefilmer surface.

28. The fuel injector as in claim 27, wherein the annular body of the shroud and swirler assembly is located relative to the nozzle portion such that the radial inflow swirler directs the first swirling air flow directly towards the nozzle portion.

29. The fuel injector as in claim 28, wherein the radial inflow swirler is downstream of the nozzle stem.

30. The fuel injector as in claim 29, wherein the radial inflow swirler includes vanes oriented to direct air in a radially inward swirling manner.

31. The fuel injector as in claim 30, further including a plurality of radially-outward extending fuel passages located in an annular arrangement around the nozzle portion to direct fuel in a plurality of discrete fuel streams toward and against the prefilmer surface.

32. The fuel injector as in claim 27, wherein the outer air swirler includes vanes initially directing the air flow in an axial manner relative to the nozzle assembly, and a downstream portion which then directs the air in a converging manner toward the central axis of the nozzle assembly.

33. The fuel injector as in claim 27, wherein the radial inflow swirler includes radially-directed swirler vanes located upstream of the prefilmer surface, and the outer swirler includes axially-directed swirler vanes in outwardly-surrounding relation to the annular body of the shroud and swirler assembly.

34. The fuel injector as in claim 27, wherein the prefilmer surface of the annular body of the shroud and swirler assembly has an annular convex configuration, diverging away from the central axis of the nozzle assembly.

35. The fuel injector as in claim 27, wherein the at least one fuel passage is also angled downstream to direct the fuel in a radially-outward and downstream direction.

36. The fuel injector as in claim 35, wherein the at least one fuel passage is also oriented to direct the fuel in a swirling manner.

37. The fuel injector as in claim 27, further including an annular sleeve disposed between the nozzle portion and the annular body of the shroud and swirler assembly, the sleeve including a forward end having an outwardly facing annular concave portion directing the first air flow from a radially-inward direction to essentially an axial direction and directly against the secondary nozzle portion.

38. The fuel injector as in claim 27, wherein the nozzle portion and the shroud and swirler assembly defines an airblast nozzle integral with the fuel injector.

* * * * *